June 11, 1963 — B. C. MATHEWS — 3,092,946
ROTARY CUTTER
Filed Feb. 1, 1961 — 4 Sheets-Sheet 1
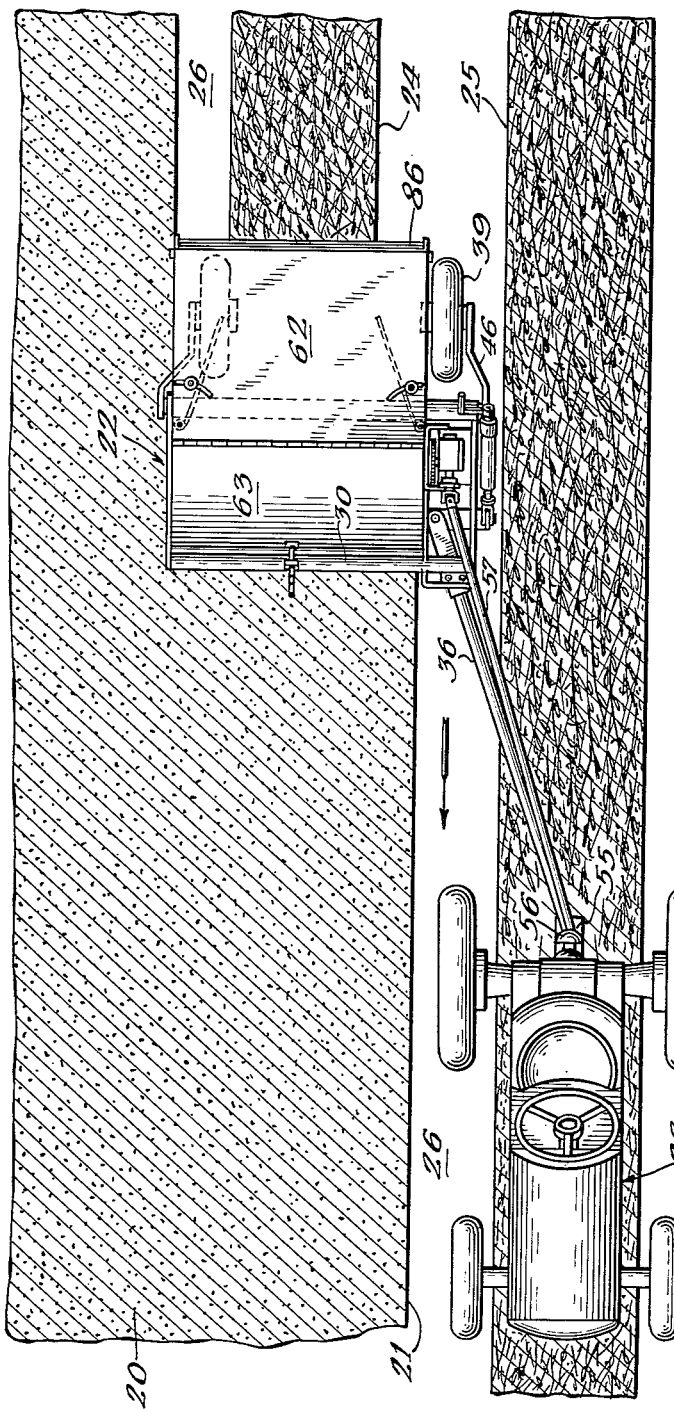
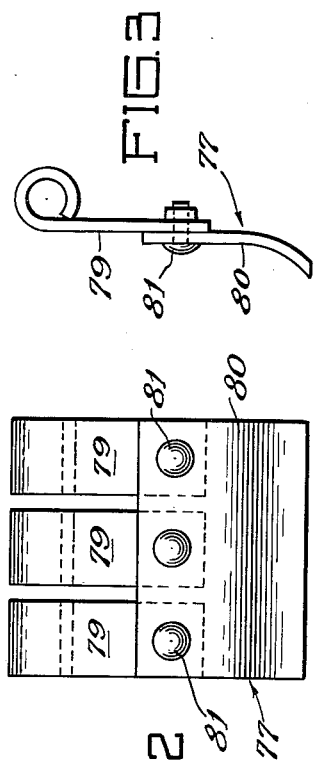
Inventor:
Bernard C. Mathews
By: Zahrl, Baker, York,
Jones & Dithmar
Attorneys

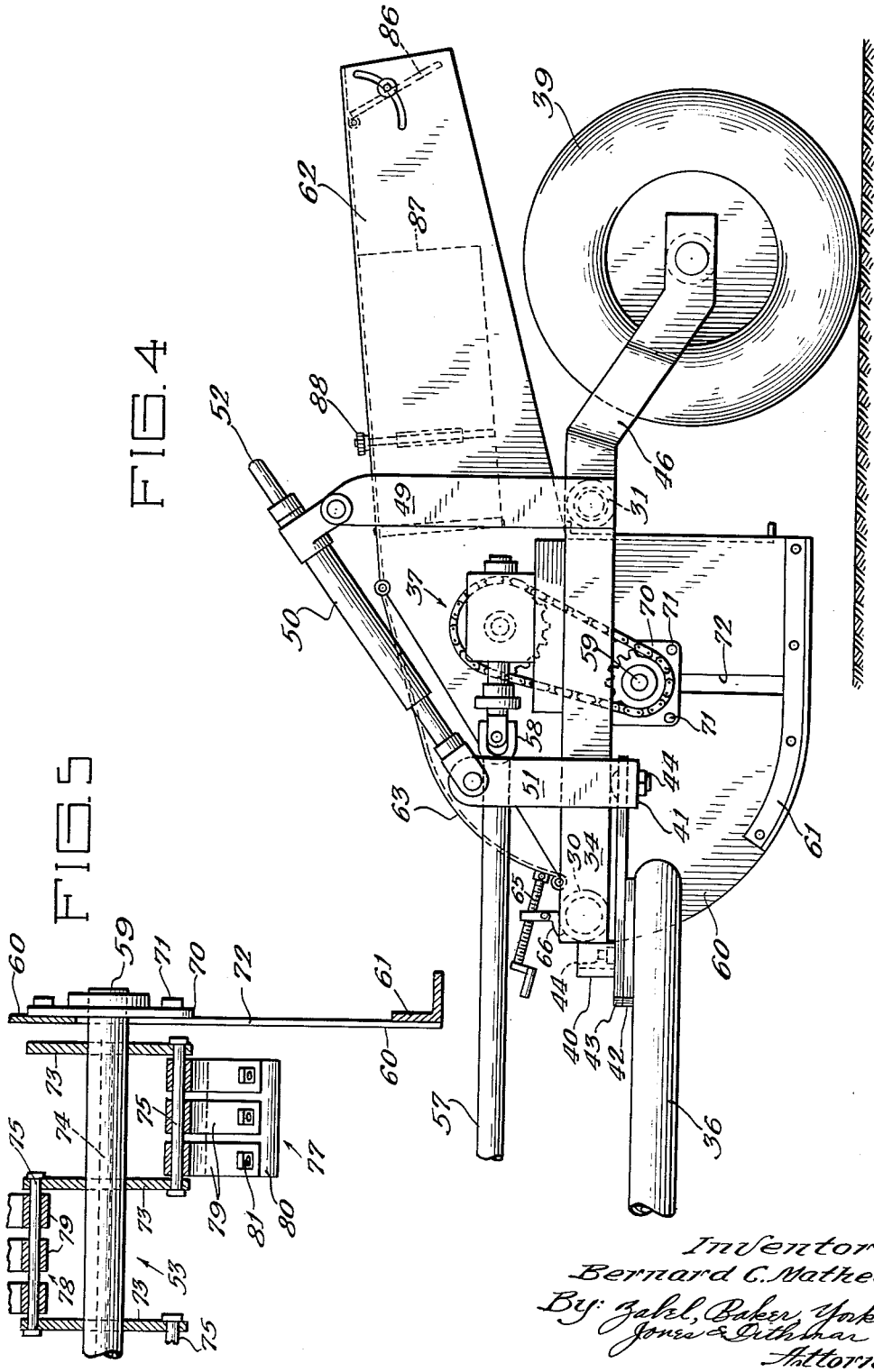

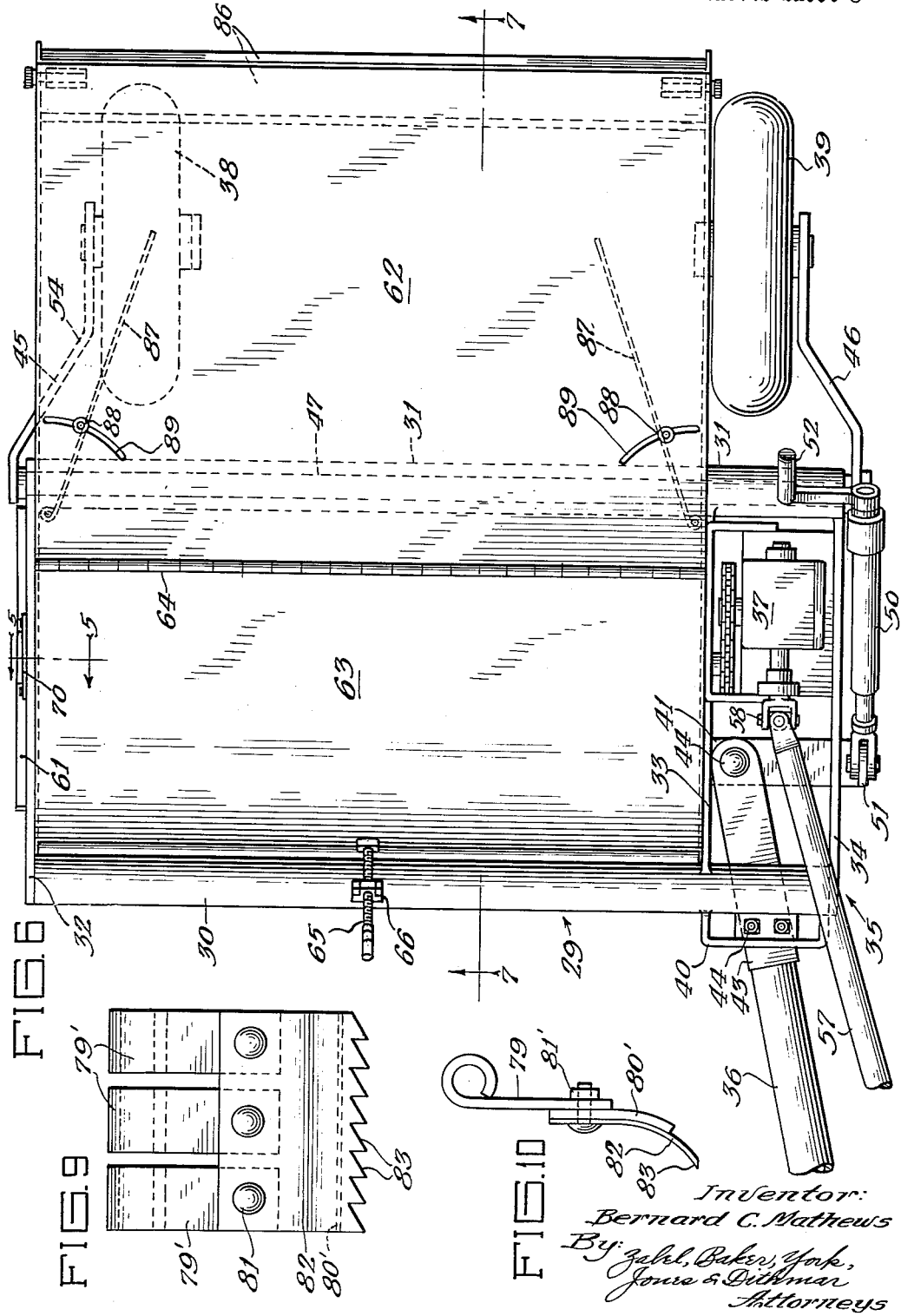

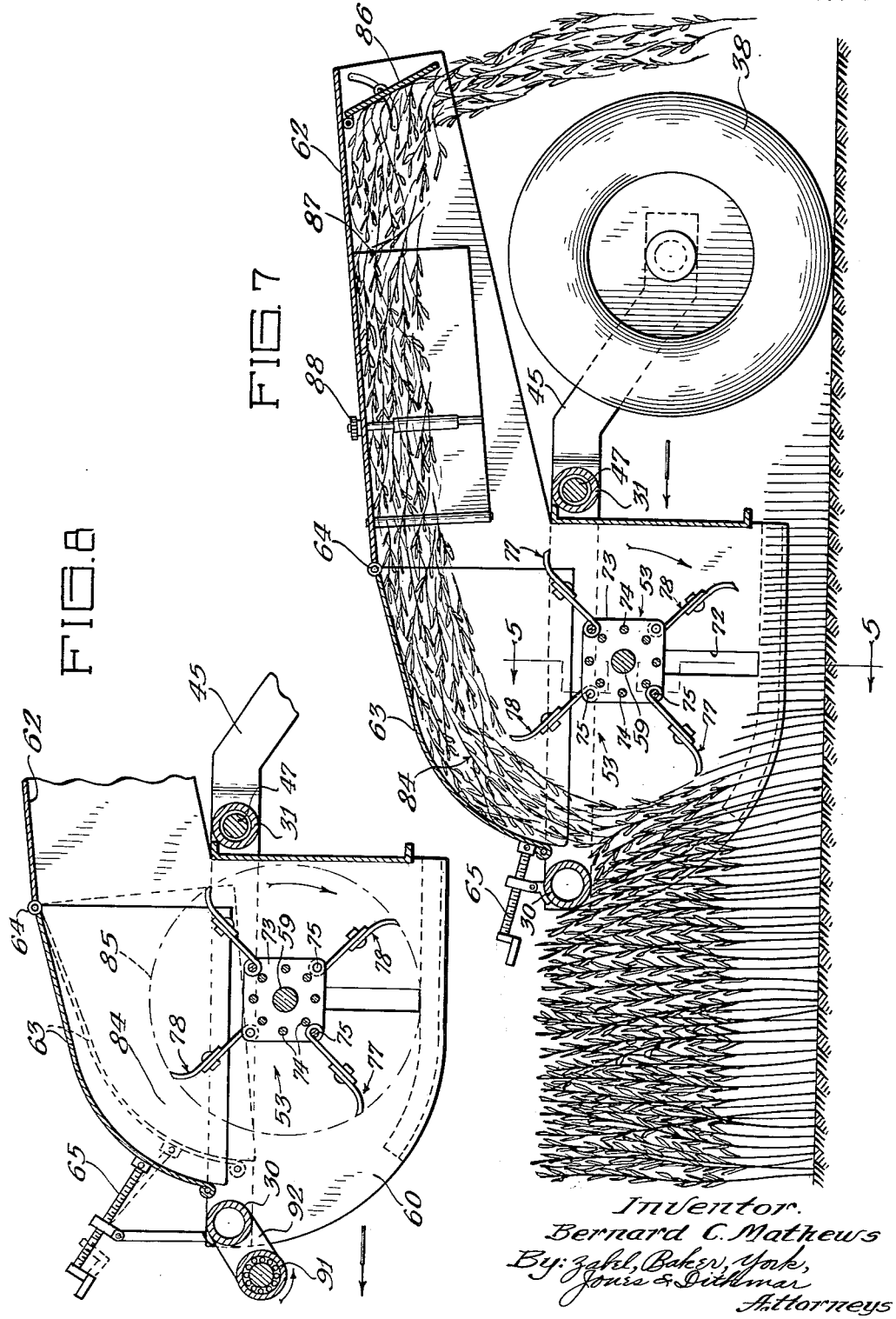

United States Patent Office 3,092,946
Patented June 11, 1963

3,092,946
ROTARY CUTTER
Bernard C. Mathews, Box 202, Crystal Lake, Ill.
Filed Feb. 1, 1961, Ser. No. 86,471
10 Claims. (Cl. 56—24)

This invention relates to a rotary scythe for hay and like crops, and to a method of mowing same without chopping.

It is an object of my invention to provide a device which not only cuts and windrows the crop, but also conditions it for more rapid drying.

The usual sickle bar type of mower leaves the crop on the ground in a shingled arrangement with the leaves on the top and the stems below. The stems contain more moisture than the leaves, and therefore would take a longer time to dry even if the hay were deposited with the stems up. However, when deposited with the stems down, drying is unduly prolonged.

The drying process is accelerated by conditioning the hay as soon as it is mowed, the term "conditioning" referring to the process of crimping the individual plants and depositing them on the ground in a random and fluffed arrangement. The crimps make the deposit of plants fluffy which promotes air circulation and more rapid drying. Furthermore, the stems are oftentimes abraded or broken at the crimps with the result that the moisture can bleed out which facilitates drying.

Another object is to provide an improved method of mowing in which the blade rotates into the crop as it advances, and in which the plants are severed and crimped without chopping and then conducted through the mower and deposited in a windrow.

According to my invention, I use a device which cuts against the stiffness of the stem, just as a scythe does, and in which the parts are so arranged that the plants are inverted and fed through the device in the form of an attenuated mat, but at a speed considerably less than the linear speed of the blades. Thus the plants are engaged by the blades several times as they pass through the device with the result that two or more crimps are made in each plant.

My invention is illustrated as applied to a flail type of device in which the blades comprise a plurality of swingles mounted side by side and forming a part of a rotor assembly, but it will be understood that my invention is applicable to devices embodying other types of blades.

It has been proposed to use a flail type device as a combination mower and chopper, but this is suitable only for green feed where the chopped hay is loaded directly into the wagon. If the chopped hay is deposited on the ground for drying, the small particles, such as leaves and short lengths of stem, drop down into the stubble, and it is very hard to pick them up at a later time. As a result, the most nourishing part of the hay is lost. Also chopped forage does not dry easily.

A further object of my invention is to adapt a flail type device so that it will both mow and condition but will not chop.

Another object is to provide a device which after mowing and conditioning will deposit the fluffed and conditioned hay on the ground in windrows of controlled width and depth.

I have also found that a flail type device can be used for the practice of my invention if the plants are initially engaged in a certain manner which reduces plant friction, and if the rotor shaft is operated at about one-half the usual speed, and if certain changes are made in the housing structure. These changes include the elimination of the shear blade, the opening up of the front of the housing, and increasing the clearance between the periphery of the swingles and the housing.

Other changes are the use of a swingle blade of greater width than that of the ordinary chopper so as to avoid leaf stripping which occurs when a stem is located between the paths of two adjacent blades.

In the usual chopper, although the swingles are angularly offset from adjacent swingles to provide a balanced rotor assembly, nevertheless, there is only one swingle mounted on the rotor shaft at any given point. In other words the arrangement is equivalent to a single row of swingles. According to my invention, I provide a plurality of rows of swingles which, even though adjacent swingles may be angularly offset from each other, result in an arrangement where there are at least two swingles mounted on the shaft at a given point. The use of a plurality of rows of swingles avoids the winding of the hay around the rotor shaft, and also compensates for the lower speed of rotation.

Another object is to provide a swingle having a replaceable blade.

Still another object is to provide a device of the type described having an adjustable windrowing means.

A further object is to provide an improved frame structure for a rotary scythe.

A further object is to provide a device of the type described which is effective both in thin stands of crop and thick stands.

Other objects, features and advantages will become apparent as the description proceeds.

With reference now to the drawings in which like reference numerals designate like parts:

FIG. 1 is a plan view of a preferred embodiment of my invention showing its relationship to the tractor and to the crop;

FIG. 2 is an elevation of a swingle;

FIG. 3 is an end view thereof;

FIG. 4 is a side elevation of a rotary scythe;

FIG. 5 is a vertical transverse section taken along line 5—5 of FIG. 7;

FIG. 6 is a plan view of FIG. 4;

FIG. 7 is a vertical longitudinal section taken along line 7—7 of FIG. 6, and illustrating the operation;

FIG. 8 is a view similar to FIG. 7 but showing a modification; and

FIGS. 9 and 10 are views similar to FIGS. 2 and 3 but showing a modified swingle.

With reference now to FIG. 1, the reference numeral 20 designates the standing crop, and 21 designates the dividing line between the standing crop and the cut portion of the field. The mower 22 is pulled by a tractor 23 which is offset from the mower so that the tractor rides in the cut portion, to the left of the boundary 21. The mower picks up and deposits the hay in a windrow 24 which is spaced from the previously deposited windrow 25 so as to provide paths 26 for the tractor wheels.

The mower 22 includes a rectangular frame 29, as shown in FIG. 4, which comprises front and rear tubular transverse members 30 and 31, and longitudinal connecting members 32, 33 and 34. The longitudinal members 33 and 34 are both located at the left side of the mower and cooperate with the tubular members 30 and 31 to provide a subframe 35 to which is secured the draw bar 36 and on which is mounted a drive mechanism 37. The mower is supported at three points, one being the outer end of the draw bar 36, and the other two points being the right and left wheels 38 and 39.

The subframe 35 includes a front bracket 40 and a crosspiece 41 to which the draw bar 36 is secured by means of suitable plates 42 and 43 which may be welded to each other and to the rear end of the draw bar. Suitable bolts 44 may be employed to secure the draw bar assembly to the subframe 35.

The wheels 38 and 39 are mounted on pivoted arms 45, 46 which are mounted at the ends of a shaft 47, suitably journaled in the rear tubular member 31. The arm 46 is in the form of a bell crank (FIG. 4) having an upwardly extending portion 49 which is connected by an adjusting screw 50 to a bent up end 51 of the cross-piece 41. Thus, by actuating a hand crank 52, the elevation of the wheels 38, 39 may be shifted to regulate the elevation of the frame 29 and the rotor assembly 53.

The rear end of arm 45 may be offset as at 54 so as to cause the wheel 38 to ride in the path 26.

The tractor 23 includes the usual hitch plate 55 to which the front end of the draw bar 36 is connected, and it includes a power takeoff 56 to which the front end of drive shaft 57 is connected for driving the drive mechanism 37. The drive shaft 57 may include a suitable universal joint 58. The drive mechanism 37 drives a transverse rotor shaft 59, as shown in FIG. 4.

The frame arrangement described provides the high degree of rigidity which is required due to the offset draw bar 36, and which rigidity is provided partly by the use of tubular transverse members.

Mounted on the frame 30 is an enclosure which includes side walls 60 which carry skids 61 at their lower edges. Extending rearwardly from the upper part of the side walls 60 is a delivery duct 62 which may form a continuation of the side walls 60. An adjustable cover 63 is mounted by a hinge 64 to the front end of the top sheet of the duct 62, and the position of the cover is regulated by an adjusting screw 65 which is mounted on a bracket 66 on the transverse member, 30. The side walls 60 and the cover 63 cooperate to form a housing which surrounds the upper front portion of the rotor assembly 53. The cover 63 forms the front wall of this housing.

The rotor shaft 59 is mounted in bearings 70 which are suitably secured to the side walls 60 by means of screws 71, the side walls being provided with slots 72 so that the elevation of the rotor shaft 59 may be adjusted by relocating the screws 71.

The rotor assembly 53 includes a plurality of square plates 73 which are suitably keyed to the rotor shaft 59 and which are connected together by transverse rods 74 (FIG. 4), and suitable spacers not shown. Headed pins 75 connect each two plates, such as the first and second, the third and fourth, etc., as shown in FIG. 5. These pins 75 are located at the 0° and 180° positions, and on each pin is mounted a swingle 77, so that between the number one and number two plates, there are two swingles located 180° apart.

Connecting the second and third plates, the fourth and fifth, etc., are headed pins 76 located in the 90° and 270° positions, and these pins support swingles 78. Thus, the second and third plates also support two swingles 78, which are 180° apart.

As shown in FIGS. 2 add 3 each swingle 77 or 78 comprises three hangers 79 and a single blade 80 which is secured at the outer end thereof by a suitable nut and bolt 81. Thus, the blades 80 may be replaced, if damaged, without removing the swingle in its entirety, which would require removal of the headed pin 75 or 76.

According to the modification of FIGS. 9 and 10, the blade 80' is provided with a replaceable edge 82 which is formed from a high grade steel of thinner stock. When the swingle engages a rock, damage to the blade is minimized by the pivoted mounting of the swingle, but nevertheless blades are occasionally damaged, and either of the arrangements shown permit fairly easy replacement. However, in the modification of FIGS. 9 and 10, it is more economical to replace the less costly edge 82 than it would be to regrind the blade 80 of FIGS. 2 and 3. Furthermore, the use of the replaceable edge 82 permits the provision of a saw tooth blade edge 83 which provides a cleaner cut which is comparable to the stroke of a scythe as contrasted with the action of a straight blade edge which sometimes tears when it is dull.

The flail type of arrangement permits yielding of the blade when a rock is encountered in the field, and oftentimes the yieldable blade is not damaged thereby. The constructions shown permit blade replacement if damage does occur. However, other types of yieldable blades may be employed with equal effectiveness, such as a rubber mounted blade, or a continuous blade of light weight spring steel.

The delivery duct 62 is an open bottom structure which is oriented in a generally tangential direction with respect to the blade path 85. The discharge portion comprises a baffle 86 or fluff board disposed in the path of the rapidly moving plants which interrupts their horizontal motion and causes them to drop directly to the ground in a random arrangement which facilitates drying, and in a well defined windrow. The impact of the crimped plants with the baffle 86 tends to bend the plants at the crimp and hence to fluff them. The delivery duct also has a tapered wall portion so that the windrow can be enough narrower than the mower so as to provide the paths 26 and to facilitate picking up the hay. In the embodiment illustrated, the tapered wall portions are in the form of hingedly mounted wings 87 which can be secured in adjusted position by means of screw threaded devices 88 which project upwardly through arcuate slots 89. Thus, the width of the windrow can be regulated in accordance with the thickness of the crop stand to provide a windrow of optimum depth.

I have found that by orienting the delivery duct 62 at an angle that is slightly less than tangential, that the plants, or the attenuated mat formed thereby, will tend to hug the top sheet, and will not drop to the ground until they engage the discharge baffle 86. By thus eliminating a bottom sheet, the possibility of duct clogging is avoided which might otherwise occur, especially in view of the tapering side wall portions or wings 87.

In operation, as the device moves forwardly into the crop, as shown in FIG. 7, the swingle blades 80 cut the plants at about the bottom of the stroke. The arrangement is such that the concave portion of the blade 80 picks up the stem of the plant and carries it upwardly into the throat 84 of the machine, this being the clearance between the blade path 85 and the cover 63. The throat 84 extends through substantially 90°, representing the upper front quarter of the rotor assembly. The stem of the plant is thus lifted up into the throat 84 and carried upwardly and rearwardly, and the friction of the plant on the front tubular member 30 assists in causing the plant to be inverted. Since the rotary scythe is moving forwardly at about one-tenth of the linear blade speed, a short portion of the stem will overlap the blade 80 so that as the blade pushes the plant into the throat 84, a crimp will be put into the stem at that point.

The inverted plants move upwardly and rearwardly in the form of an attenuated mat as shown in FIG. 7, but due to plant friction, as well as other considerations, such as inertia and friction all along the inner surface of the cover 63, the plants will move at considerably less speed than the linear blade speed. This causes the blades to put additional crimps in the plants as they move through the throat.

Plant friction arises from the entanglement of the leafy portions of the plants with each other, as the cut plants are pulled away from the uncut plants, and also from the friction between the trailing edges of the plants and the tubular member 30. Both of these aspects of plant friction are a function of the elevation of the plant engaging or tubular member 30.

Although the plant friction assists in the inversion of the plant and cooperates with the blade action in the crimping, it must not be so great as to cause chopping of the plant. For instance, in a chopper not only is the throat much narrower, a matter of an inch or two at the most, but a shear blade is generally located at a point below the axis of the rotor shaft which causes the stem to be cut into several parts two or three inches long.

According to my invention, the shear blade is eliminated and the throat is from two to five inches wide with the result that instead of chopping the plant into several small lengths, the stem is merely crimped. However, the throat is not made so wide that the mat is unduly attenuated in the thickness direction, which would have the result of reducing crimping.

For that reason, the cover is adjustably mounted so that an optimum throat dimension may be obtained, which is wide enough to prevent chopping, and not so wide as to reduce crimping.

I have found that due to variation in the thickness of the crop stand, that the optimum throat dimension varies accordingly. For instance, with a thin stand, a two inch throat may be sufficient, and in this instance, the wings 87 in the delivery duct may be partially closed to provide a comparatively narrow windrow. On a thick stand, however, the throat is opened up to provide a four or five inch dimension, and the wings 87 may be opened up so as to provide a wider windrow, thus avoiding an unduly deep window which would retard drying.

It will be observed that the opening at the front of the device is relatively high, being determined primarily by the location of the transverse tubular member 30 which serves as a plant engaging member. The use of a high opening reduces the plant friction and thus reduces chopping. However, in some instances, a somewhat smaller opening is desired, and in such cases, as shown in FIG. 8, I adjustably mount a roller 91, by means of brackets 92 on the cross member 30 so that the roller extends somewhat below the cross member to provide a smaller opening. The roller reduces the plant friction, and may either be driven or be idle, but in either event, it provides a smaller opening, without correspondingly increasing the plant friction to a point where chopping will occur.

Leaf stripping is reduced by providing a relatively wide swingle blade, and it may be eliminated altogether by providing a continuous blade extending the full width of the machine, and the blade may either be straight or of a helical shape to provide a shearing action as in the case of the edge portions 83 of FIG. 9 which are cut on a shear angle. In other words, due to the curvature or bending of the blade 80', the edge portions 83 will approximate a helical edge, and hence provide a shear angle.

The blade angle, due to bending, may be from 30° to 50°, and it assists in the picking up and inversion of the plants.

If desired, in addition to the plates 73, auxiliary plates may be mounted on the rotor shaft 59 and rods 74 in order to provide additional support for the headed pins 75 and 76 at points between the hangers 79.

In the usual flail type of chopper device, the plants or crop elements are initially engaged at a point comparatively close to the base with the result that the plant elements are deflected to a much greater extent than in the present mowing device. The friction between the plant engaging element, such as the lower edge of the chopper housing, and the plants serves to prevent the plant from being drawn into the housing and upwardly by the blades, with the result that as the rotor advances into the crop, successive portions of the stem are cut off, and that which is thrown upwardly by the blades comprises only the chopped hay. In order to facilitate the chopping, a shear blade is usually located in the lower front quarter of the blade path which also serves to prevent the whole plant from being thrown upwardly through the housing. Furthermore, the small or chopped particles tend to drop downwardly into engagement with the blades, and the much greater speed of the blades causes additional chopping of the previously cut stem lengths.

In the present arrangement, the plant friction is greatly reduced by the higher elevation of the plant engaging element which can be either the frame portion 30, or the lower edge of the housing. In the event that a greater degree of plant deflection is desired than would be provided by the location of cross bar 30 or housing edge, then the plant deflecting element can be in the form of the roller 91 shown in FIG. 8, which, due to its rotation, reduces the plant friction which would ordinarily be experienced at this elevation.

The lowered plant friction in conjunction with the lower rotor speed avoids severance of the stem as the plant is being inverted and drawn upwardly into the throat.

However, there is sufficient plant friction as to retard the overall speed of the crop which is in the form of an attenuated mat with the result that the blades will engage a given length of plant several times before the plant finally clears the path of the blade and moves into the duct.

In order to compensate for the slower blade speed, which would ordinarily result in a fewer number of cutting strokes per foot of machine advance, the number of blades mounted at any one point on the rotor is increased, which is to say that the angular spacing between blades is reduced from 360° to 180°, or even to 120°.

According to a preferred embodiment, at 840 r.p.m., the linear blade speed is about 80 feet per second, whereas the mower is pulled at 5 m.p.h., which represents a blade advance of about 7 feet per second. Thus a given blade cuts once every six inches of advance, and by providing two rows of blades, a cutting stroke is provided for every three inches of advance.

Although only a preferred embodiment of my invention has been shown and described herein, it will be understood that various modifications and changes may be made in the construction shown without departing from the spirit of my invention as pointed out in the appended claims.

I claim:

1. A mowing machine comprising a rotor including a plurality of cutting blades, a housing surrounding the upper front portion of said rotor and including a front wall providing a throat, the width of which is measured by the clearance between the blades of said rotor and said front wall, crop engaging means at the lower front end of said front wall for bending the plant elements of said crop forwardly, and being located at an elevation sufficiently high as to provide comparatively low frictional resistance to the movement of said plant elements as they are drawn into said housing by said blades and inverted, the width of said throat being in excess of two inches at the narrowest point to cause said inverted plants to pass through said throat as an attenuated mat, and a rearwardly extending duct connecting with said housing and having a tapering portion and a discharge portion for depositing the cut crop in a windrow behind the mowing machine.

2. A mowing machine as claimed in claim 1 in which said tapering portion of said duct comprises an adjustable wall portion for regulating the effective width of said discharge portion in order to regulate the depth of the windrow in accordance with the thickness of the crop stand.

3. A mowing machine as claimed in claim 1 in which said front wall is adjustably mounted in order to regulate the width of said throat in accordance with the thickness of the crop stand.

4. A mowing machine as claimed in claim 1 in which said rotor includes a plurality of swingles which are arranged in two rows which are spaced from each other by 180°, adjacent swingles of a given row being angularly offset from each other.

5. A mowing machine as claimed in claim 1 in which said rotor includes a plurality of swingles, one for each of said cutting blades, each swingle comprising a plurality of hangers, and a single cutting blade supported by said hangers at their ends.

6. A mowing machine as claimed in claim 1 in which said rotor includes a plurality of swingles, one for each of said cutting blades, each swingle having a curved backing blade at its outer end, and a replaceable cutting edge member overlying and being secured to said backing blade, said edge member having a serrated edge portion.

7. A mowing machine as claimed in claim 1 in which said cutting blades are yieldably mounted on said rotor and include edge portions which are cut on a shear angle.

8. A mowing machine as claimed in claim 1 in which said rotor includes a plurality of rows of cutting blades, and means to drive said rotor at a speed such that the linear speed of said blades is substantially ten times the speed at which said mowing machine is advanced through the crop, there being a sufficient number of rows of blades as to provide more than two cutting strokes per foot of advance of said mowing machine.

9. A mowing machine as claimed in claim 1 in which said duct is an open bottom duct, and in which said discharge portion of said duct comprises a baffle located at the outer end of said duct.

10. A mowing machine comprising a rotor including a plurality of cutting blades, a housing surrounding the upper front portion of said rotor and including a front wall providing a throat, the width of which is measured by the clearance between the blades of said rotor and said front wall, crop engaging means at the lower front end of said front wall located at an elevation such that it will engage the plant elements of said crop at an upper portion thereof for bending said plant elements forwardly to permit said cutting blades to sever said plant elements at a point near the base of their stems, and means for adjusting the position of said front wall with respect to the path of said blades in order to regulate the width of said throat in accordance with the thickness of the crop stand so as to permit said plants to pass through said throat without chopping.

References Cited in the file of this patent

UNITED STATES PATENTS

| | | |
|---|---|---|
| 2,888,795 | Lundell | June 2, 1959 |
| 2,902,813 | Brady | Sept. 8, 1959 |

FOREIGN PATENTS

| | | |
|---|---|---|
| 1,212,241 | France | Oct. 19, 1959 |